United States Patent [19]

Behrendt et al.

[11] 4,266,531
[45] May 12, 1981

[54] ROOFTOP SOLAR ENERGY COLLECTOR PANEL

[75] Inventors: Bruce O. Behrendt; Ignacio L. Cisneros; Ronald B. Stephenson; Donald R. Stephenson, all of Odessa, Tex.

[73] Assignee: Solar Southwest, Odessa, Tex.

[21] Appl. No.: 960,303

[22] Filed: Nov. 13, 1978

[51] Int. Cl.³ .............................................. F24J 3/02
[52] U.S. Cl. .................................................. 126/449
[58] Field of Search ............... 126/417, 428, 432, 429, 126/441, 449, 450

[56] References Cited

U.S. PATENT DOCUMENTS

| | | | |
|---|---|---|---|
| 2,918,709 | 12/1959 | Corcoran | 126/417 |
| 4,016,861 | 4/1977 | Taylor | 126/449 |
| 4,114,593 | 9/1978 | Guertin | 126/449 |
| 4,128,095 | 12/1978 | Oren | 126/449 |
| 4,132,217 | 1/1979 | Rom | 126/449 |
| 4,135,490 | 1/1979 | Saleau | 126/450 |
| 4,159,017 | 6/1979 | Norii | 126/450 |
| 4,180,057 | 12/1979 | Ward | 126/449 |

Primary Examiner—Herbert F. Ross
Attorney, Agent, or Firm—Marcus L. Bates

[57] ABSTRACT

A solar energy collector panel adapted to be mounted on a rooftop for heating air forced therethrough. The panel is rectangular in form and outwardly opens. A closure member is affixed to the outermost peripheral edge portion of the housing and forms a thermal barrier through which solar energy can travel into the interior of the housing, while thermal energy is restricted from traveling therefrom. The panel includes a plurality of parallel, adjacent, spaced-apart, series connected tunnels, each having a multiplicity of heat transfer members which absorb solar energy from the sun and dissipate thermal energy to air flowing thereacross. A blower pulls air from an outlet formed in the panel and directs the air into an enclosure. Cool air is received by an inlet formed in the panel and travels in series relationship through each of the tunnels so that thermal energy is transferred into the air as the air travels along a torturous path through the panel.

4 Claims, 8 Drawing Figures

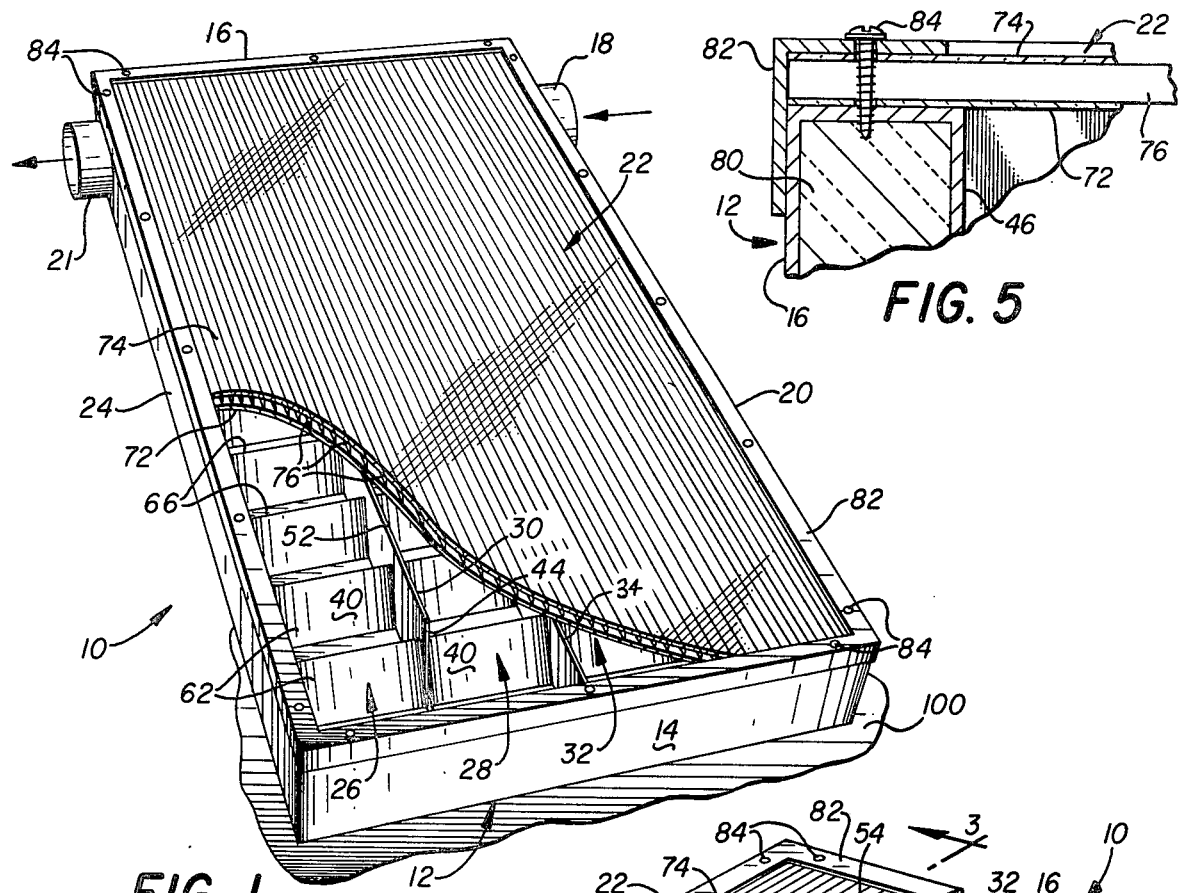
FIG. 1
FIG. 5
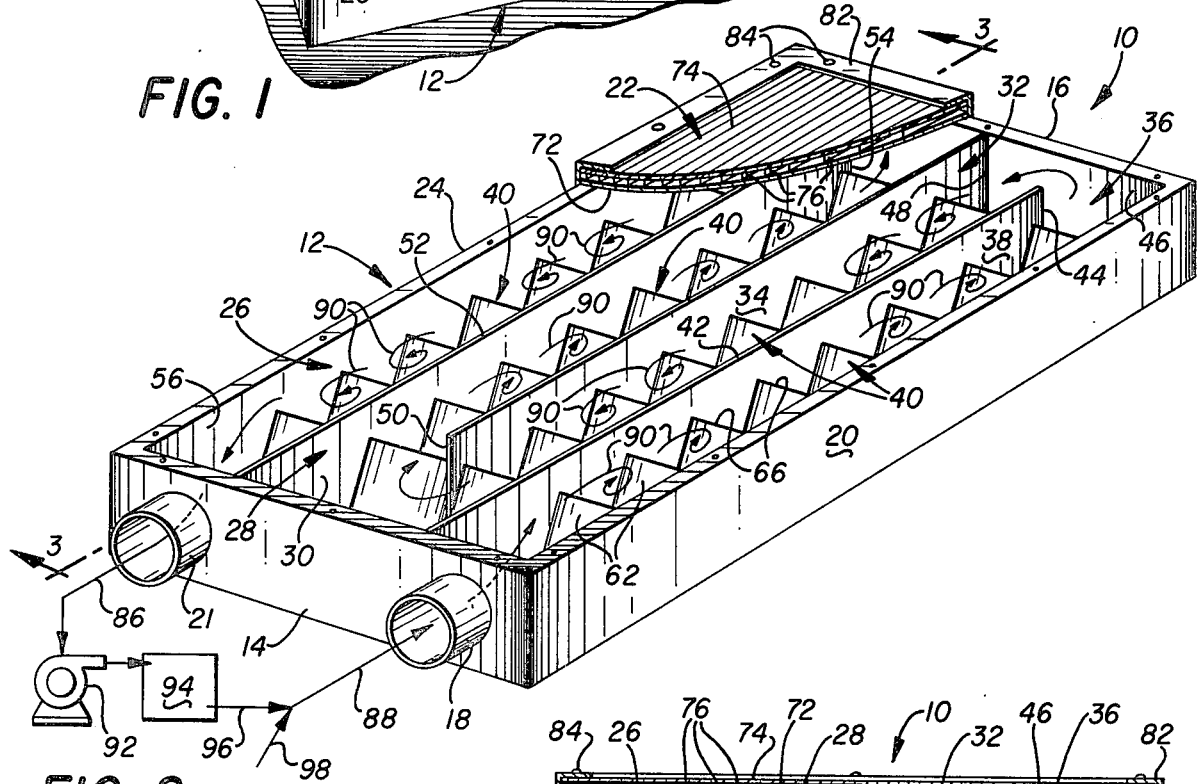
FIG. 2
FIG. 4

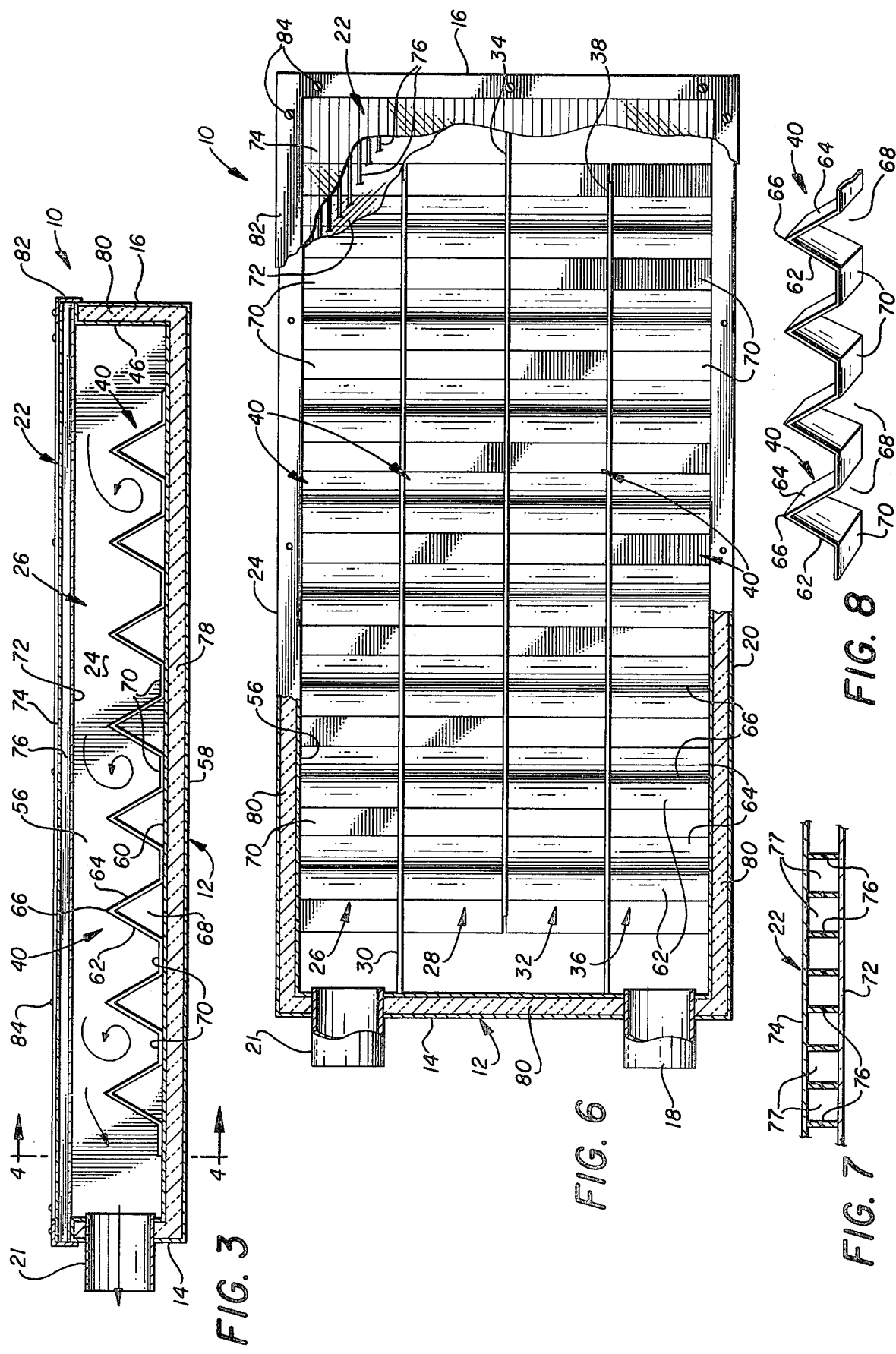

ROOFTOP SOLAR ENERGY COLLECTOR PANEL

BACKGROUND OF THE INVENTION

There are many different solar heating systems available for domestic use. Many of these systems employ a liquid heat transfer medium, such as water, so that heat energy can be accumulated during the times when the sun is shining and the accumulated energy subsequently released when the sun is not shining. These systems are very costly because of the complex design thereof which requires a considerable amount of expensive conduits, piping, pumps, and storage vessels.

There are geographical regions, such as the magnificient southwestern part of the United States, where the sun shines almost everyday, and the people who live in this region usually sleep during hours of darkness, and consequently, solar energy is available almost all of the time when heat is needed.

It is therefore desirable to make available an inexpensive solar heating system which does not require expensive piping and storage tanks, and which can be easily installed externally of an enclosure so that solar energy can be directly used during the daylight hours in order to elevate the temperature of the enclosure. Such a desirable, low cost, solar energy heating system is the subject of this invention.

SUMMARY OF THE INVENTION

A solar heating system which has a solar energy collector panel adapted to be mounted on a roof top. Air is circulated through the panel where the temperature thereof is elevated. The air is conducted from the panel into an enclosure, thereby providing economical heating during the time of the day when the sun is shining.

The system includes the aforementioned panel, a conduit means, and a blower, all connected together so that air is circulated between the panel and an enclosure with a minimum of operational cost.

The panel is simple and novel in design and is especially adapted to minimize heat losses to ambient and to resist hail damage. The panel upwardly opens toward the source of radient energy, and includes a closure member which is also a thermal barrier. A plurality of heat collecting tunnels are series connected so that the circulated air flows through each tunnel while the temperature thereof is being elevated. Each tunnel includes several heat transfer members, made in accordance with this invention, which absorbs solar energy and transfers the energy into the air being circulated thereacross, thereby elevating the temperature of the air and subsequently raising the temperature of the enclosure.

A primary object of this invention is the provision of improvements in solar energy collector panels for heating air which is forced to flow therethrough.

Another object of this invention is the provision of an improved solar heating system which employs air as the heat transfer member.

A further object of this invention is the provision of a solar energy collector panel which is low in cost, simple in design, efficient in operation, and which can withstand the deleterious effects brought by most hail storms.

Another and still further object of this invention is the provision of a means for elevating the temperature of an enclosure by circulating air through a novel solar energy collector panel which directly exchanges solar heat energy with the air.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

THE PRIOR ART U.S. Pat. No. 4,059,226 U.S. Pat. No. 4,046,133 U.S. Pat. No. 4,078,544 U.S. Pat. No. 4,026,268 U.S. Pat. No. 3,987,786 U.S. Pat. No. 3,902,474 U.S. Pat. No. 3,391,688 U.S. Pat. No. 4,054,124 U.S. Pat. No. 4,069,809 U.S. Pat. No. 4,062,346 U.S. Pat. No. 3,994,276 U.S. Pat. No. 3,946,944 U.S. Pat. No. 3,894,685 U.S. Pat. No. 2,680,437

Pyle U.S. Pat. No. 3,902,474, discloses a solar cell including a sinuous passageway for flow of air. Atkinson, U.S. Pat. No. 4,059,226, discloses a zigzag path for air flow. Cook, U.S. Pat. No. 4,046,133, discloses a double pane of glass. Knoos, U.S. Pat. No. 4,054,124, teaches the use of a double pane of light transmitting material. Cook appears to be the closest reference to the present invention.

However, the present system is believed to be patentable over all of the above art, for the reason that the heat gathering and turbulance producing members of applicant and the novel closure member of applicant is not found in the above cited references.

BRIEF DESCRIPTION OF THE DRAWINGS

FIG. 1 is a perspective view of a solar energy collector panel made in accordance with the present invention;

FIG. 2 is a part diagrammatical, part schematical, perspective view of a solar energy heating system made in accordance with the present invention, with some parts being broken away and removed therefrom in order to better illustrate the details of construction;

FIG. 3 is a cross-sectional view taken along line 3—3 of FIG. 2;

FIG. 4 is a cross-sectional view taken along line 4—4 of FIG. 3;

FIG. 5 is an isolated, fragmented, part cross-sectional, detailed illustration of part of the foregoing apparatus;

FIG. 6 is a schematical, top plan view of FIG. 2, with some parts being removed therefrom;

FIG. 7 is an enlarged, cross-sectional, fragmented view of part of the apparatus disclosed in the foregoing figures; and, FIG. 8 is an isolated view of part of the apparatus disclosed in the foregoing figures.

DETAILED DESCRIPTION OF THE PREFERRED EMBODIMENTS

Throughout this disclosure, wherever it is practical or logical to do so, like or similar numerals will usually refer to like or similar elements.

In FIG. 1 of the drawings, there is disclosed a solar energy collector panel 10 made in accordance with the present invention. The panel includes an outwardly opening housing 12 having opposed ends 14 and 16. A cold air inlet 18 is formed through sidewall 20 in close proximity to end wall 16. A heated outlet 21 is formed in the opposite sidewall 24 in close proximity to the aforesaid end wall 16. Outlet 21 may instead sometimes be formed closely adjacent to end wall 14, depending upon the internal constructional configuration of the panel, as will be more fully appeciated later on in this disclosure. Closure member 22 is affixed to the peripheral edge portion of the housing.

A plurality of tunnels, 26 and 28, extend longitudinally within the panel and parallel to one another. The tunnels are separated from one another by a bulkhead 30. Other tunnels 32 are likewise longitudinally disposed in parallel relationship respective to the aforesaid tunnels. Other bulkheads 34 separate adjacent tunnels 28 and 32 from one another.

As seen in the embodiment of FIG. 2, in conjunction with the remaining figures of the drawings, the inlet 18 and outlet 21 are positioned in the end wall 14, rather than in the opposed sidewalls as in the first embodiment disclosed in FIG. 1. Tunnel 36 is separated from tunnel 32 by means of a bulkhead 38. Since there are four tunnels disclosed in FIG. 2, the inlet and outlet 18 and 21 are formed in the same end wall 14. Should there instead be an odd number of tunnels, either the inlet or the outlet would be formed in the opposed end wall 16 or, alternatively, in close proximity of the sidewall, as for example, forming the outlet through the sidewall 24.

Each of the tunnels is provided with a multiplicity of heat transfer members or baffles 40 which are spaced from upper edge 42 of bulkhead 38 in order that air can flow across the upper portion of the tunnel. The bulkhead 38 extends from an elevation determined by the upper peripheral edge portion of the housing, down to the floor thereof, with one end of the bulkhead being attached to the inside surface of wall 14, while the other end 44 is spaced from the inside surface 46 of the opposed wall 16, thereby leaving a means by which the outlet of tunnel 36 is connected to the inlet of tunnel 32.

One end of each bulkhead is therefore attached to one of the opposed end walls, as illustrated by the numeral 48, which indicates the joinder of bulkhead 34 to the inside wall surface 46 of end wall 16. Edge portion 50 of bulkhead 34 is likewise spaced from the inner wall surface of end wall 14. Numeral 52 indicates the upper edge portion of bulkhead 30, while numeral 54 indicates the free edge portion of the bulkhead which is spaced from inside wall surface 46.

As best seen illustrated in FIG. 3, in conjunction with other figures of the drawings, the inside wall surface 56 of opposed wall 24 defines one of the opposed walls of tunnel 26. The bottom 58 of the panel is spaced from the inner surface 60 thereof by means of the illustrated insulation 78. Each of the aforementioned heat transfer members 40 is in the form of opposed, inclined walls 62 and 64 which are joined together at the upper transverse edges to form an apex 66, so that the walls thereof downwardly slope away from the apex into joined relationship with respect to the floor 60, as indicated by numeral 70. Numeral 68 indicates the interior of the baffle.

The beforementioned closure member 22 is comprised of spaced-apart, upper and lower planer members 74 and 72 which are maintained spaced apart from one another by means of spacer members 76. The spacer members lie parallel respective to one another and form a rectangular air cell 77 therebetween.

The housing preferably is built up of spaced sheets of aluminum having insulation of low heat conductivity, 78 or 80, sandwiched therebetween which separates the sheets of aluminum from one another. The entire outer peripheral edge portion of the panel forms the opening thereinto and is provided with a trim strip 82 which is interposed over a marginal edge portion of the closure member. The entire assembly is screwed together, as indicated at 84 in FIG. 5. This structure provides a rigid, box-like housing which retains its form during transportation, and especially during high winds and inclement weather.

Looking again now to FIG. 2, there is diagrammatically indicated flow conduit means 86 by which warm air is pulled from the outlet 21, while cool air flows into inlet 18 by means of another flow conduit 88. The arrows at 90 indicate the flow path of the air across the baffles contained within each of the tunnels. Blower 92 forces the warm air from the interior of the panel to flow into an enclosure 94, which can be a house trailer, motor home, a room in a home, or any other sort of enclosure where an elevation in temperature is desired. The air is recirculated at 96 if desired or, alternatively, fresh air from the atmosphere 98 can be directed into the panel.

Numeral 100 indicates a rooftop, as for example, the rooftop of a home or a housetrailer. The apparatus of the present invention preferably is of double wall construction with approximately one inch of suitable insulation bonded between an outer and inner aluminum sheet metal wall. This provides a weatherproof, outwardly opening enclosure which is advantageously sealed at the upper peripheral edge portion thereof by the closure member 22. The marginal peripheral edge portion of the closure member is screwed to the peripheral edge of the housing by means of the beforementioned channel 82 and screw 84. By locating blower 92 such that reduced pressure is effected upon the interior of the panel, atmospheric pressure forces the inner surface of the closure member against the upper portion of the bulkheads, thereby isolating one tunnel from another and preventing leakage therebetween.

The closure member preferably is made of extruded plastic having an overall thickness of 7/32 inches, with the upper and lower walls thereof being 0.010 inches thick, while the spacers 76 are placed on 9/16 inch centers and are substantially the same thickness as the upper and lower sheets of material. This material is a plastic which is available from Rohm and Haas under the trade name of "Tuffak-Twinwal".

The interior of the tunnel, except, of course, for the inner surface of the lower pane, is painted with Nextel black velvet paint, which is available from 3M Manufacturing Company. This paint provides a black body which is quite suitable for intercepting solar energy and subsequently transferring the heat therefrom into the flowing air.

One example of a suitable panel is a rectangular construction 24"×48"×6", having eight spaced baffles 40 located within each tunnel, with the apexes 66 of the baffles being located on $4\frac{7}{8}$ inch centers and underlying the closure member $1\frac{5}{8}$ inches, with the lower, adjacent edges of the baffles being spaced apart $1\frac{3}{8}$ inches at 70. This provides adjacent sloped surfaces 62 and 64 placed at an included angle of 60°.

Four tunnels of the above described construction were incorporated into the panel, and the inlets and outlets arranged as in the manner of FIGS. 2 and 6. When cool air at 48° F. was circulated through the panel, the air was warmed to 136° F. An industrial grade of mineral wall fiberglass one inch thick was interposed between commercially available sheet aluminum, which was fabricated in the manner of FIGS. 4–6.

The unitary, double-layered closure member survives hailstones, and when broken with a rock, usually only the uppermost surface is broken because of the flexibility of the member together with the manner in which the closure member is attached only at the periphery of the panel.

I claim:

1. A solar energy collector panel for collecting thermal energy radiating from the sun and transferring the collected energy into air passing therethrough comprising:
    an outwardly opening housing having an insulated bottom wall, opposed sidewalls, and opposed endwalls; said sidewalls and said endwalls having a free edge which defines the periphery of the opening into said housing; an air inlet and an air outlet formed into said housing through which air can flow; a closure member attached to the free edge of said sidewalls and endwalls which forms a thermal barrier through which solar energy can travel into the interior of said housing while thermal energy is restricted from traveling away from said housing;
    a plurality of parallel, adjacently arranged tunnels through which air can flow, each tunnel having an air inlet and an air outlet, means connecting the outlet of one tunnel to the inlet of an adjacent tunnel, said tunnels being separated from one another by an impervious bulkhead or side wall which extends from said bottom wall into contacting relationship with said closure member;
    each tunnel having a multiplicity of adjacent heat transfer members extending from inlet to outlet which absorb solar energy and dissipate thermal energy to any air flowing thereacross, each said heat transfer members comprise adjacent, sloped flat imperforate surfaces which are joined to form an apex at the top thereof and which downwardly slope into contact with the bottom wall, said apex being arranged laterally respective to the flow of air through the tunnel; the apex forming walls of said heat transfer members extend from one sidewall of the tunnel to the opposed sidewall of the tunnel and in contact with each sidewall forming said tunnels;
    said apex of said heat transfer member abuts each sidewall of the tunnel and is spaced from said closure member, thereby leaving a flow passageway above said apex through which air can flow through the tunnel in heat contact relationship with the upper surface of the heat transfer members; and,
    means providing said sidewalls of said tunnel and said heat transfer members with a surface which absorbs solar energy.

2. The solar energy collector panel of claim 1 wherein said heat transfer members of one tunnel are arranged in spaced relationship respective to one another with the members being formed of a single sheet of bent-up material, said sloped wall of one member being joined to the adjacent, sloped wall of the next adjacent member by a spacer member, the spacer member being received by said bottom wall.

3. A solar energy heating system comprising a generally rectangular, outwardly opening housing, said opening being defined by a peripheral edge presented by the opposed sidewalls and end walls of the housing, a closure member attached to the peripheral edge through which solar energy can be received within said housing, said closure member being a thermal barrier which restricts flow of thermal energy away from the interior of the housing;
    a plurality of parallel, longitudinally disposed, adjacent tunnels; each tunnel is defined by opposed, parallel longitudinally arranged impervious sidewalls, a bottom wall, and said closure member; each tunnel having means forming an inlet and an outlet; means connecting each tunnel together in series relationship so that air can flow into an inlet, through a tunnel, and through an outlet into the adjacent tunnel;
    an air blower having a suction side connected to the outlet of the last of said tunnels, air conduit means connected for establishing flow from an enclosure to which the housing may be connected, to said inlet, through each of said tunnels, from said outlet, through said blower, and back into the recited enclosure;
    each said tunnel having a multiplicity of adjacent heat transfer members extending from inlet to outlet which absorb solar energy passing through the closure member and which dissipate thermal energy to air flowing thereacross; each said heat transfer member is comprised of two adjacent imperforate sloped plane surfaces which slope upwardly into joined relationship to define an apex at the uppermost end and which downwardly slope into contacting relationship with said bottom wall; said sloped plane surfaces being arranged to extend laterally in contacting relationship with the sidewalls forming said tunnel and to air flowing thereacross, said apex end being spaced from the closure member so that air can flow therebetween.

4. The system of claim 3 wherein said closure member is a relatively flexible member which is deformed against the upper edge of the sidewalls of each tunnel due to the difference in pressure of the atmosphere and the interior of the housing produced by the blower, thereby effectively sealing the interior of one tunnel from an adjacent tunnel so that air must flow from a tunnel inlet to a tunnel outlet rather than across a sidewall which separates one tunnel from an adjacent tunnel.

* * * * *